United States Patent [19]

Bargados et al.

[11] Patent Number: 5,809,707
[45] Date of Patent: Sep. 22, 1998

[54] WINDOW GUARD AND REPLACEMENT SYSTEM FOR VEHICLE WINDOWS

[76] Inventors: Vince Bargados; Walter D. Bargados; Christian J. Bargados, all of 29 Glenn, Irvine, Calif. 92720

[21] Appl. No.: 726,130

[22] Filed: Oct. 4, 1996

[51] Int. Cl.$^6$ ................................................ E06B 3/964
[52] U.S. Cl. ................... 52/204.62; 52/203; 52/204.51; 52/204.597; 52/208; 49/463; 49/61; 296/146.15
[58] Field of Search ........................ 52/202, 203, 204.51, 52/204.597, 204.5, 204.62, 208; 49/465, 464, 463, 61; 296/95.1, 84.1, 146.15

[56] References Cited

U.S. PATENT DOCUMENTS

| | | | |
|---|---|---|---|
| 2,193,852 | 3/1940 | Axe | 52/204.595 X |
| 2,591,048 | 4/1952 | Bush | 52/606 X |
| 3,045,787 | 7/1962 | Attwood | 52/204.597 X |
| 3,068,617 | 12/1962 | Borski | 52/204.597 X |
| 3,213,584 | 10/1965 | Bush | 52/204.597 |
| 3,375,626 | 4/1968 | Grotefeld et al. | 52/208 |
| 4,835,927 | 6/1989 | Michlovic | 52/204.597 |
| 5,123,211 | 6/1992 | Schlicht et al. | 52/202 |
| 5,242,207 | 9/1993 | Carson et al. | 52/203 X |

FOREIGN PATENT DOCUMENTS 0979676   1/1965   United Kingdom .............. 52/204.597

*Primary Examiner*—Winnie S. Yip
*Attorney, Agent, or Firm*—Daniel L. Dawes; Stefan J. Kirchanski

[57] ABSTRACT

A graffiti protected glass window for a vehicle can be quickly refurbished by changing a thin plastic guard window overlying the glass pane. The plastic guard window is retained within a resilient elastomeric mount which also retains the glass pane within the rigid window frame. A window guard seating space is defined along one side in a upper portion of the seating space defined in the mount for accommodating the glass pane. The side of the mount into which the window guard seating space is defined is molded so as to be slightly inwardly inclined to assist in weather sealing the window guard. The mount is selectively locked and unlocked by the use of a conventional locking channel and locking strip. The window guard is easily removed and reinserted using conventional hand tools. The window guard is securely maintained against the window pane, but is able to accommodate differentials in thermal expansion between the window glass and the window guard since their common attachment occurs only by virtue of their common seating within the mount.

5 Claims, 2 Drawing Sheets

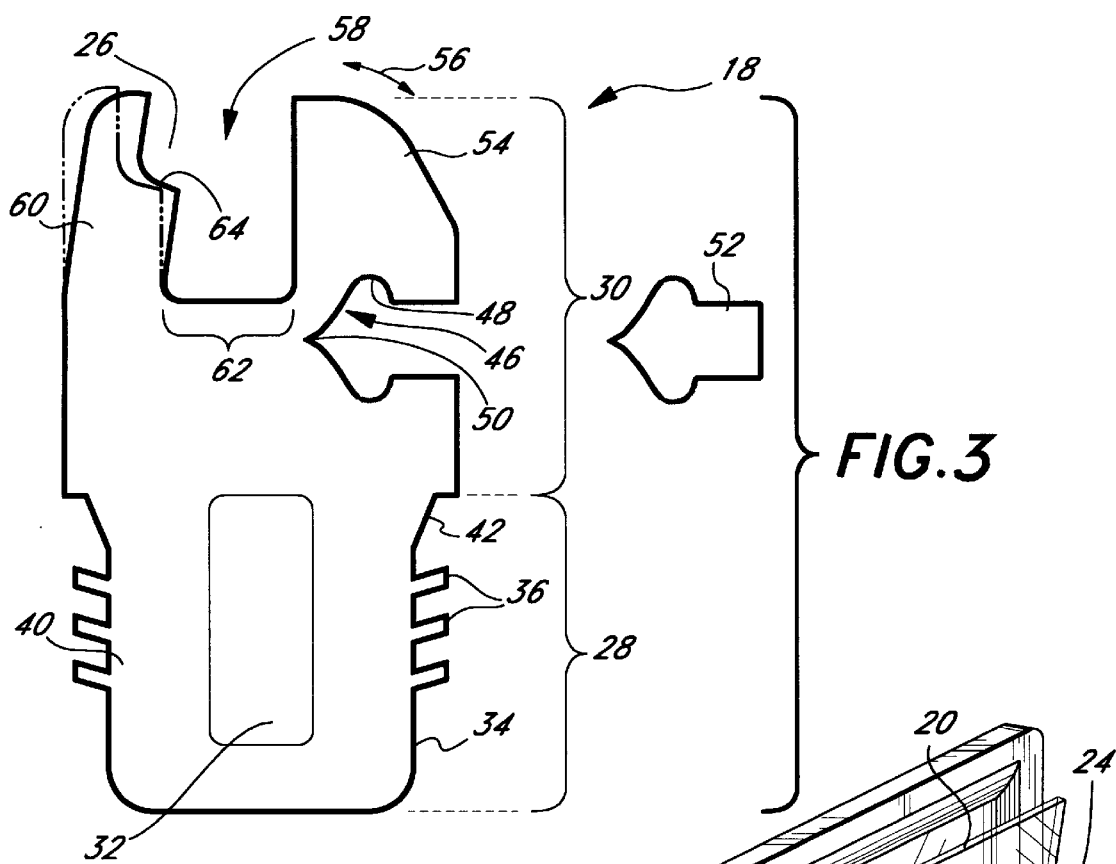
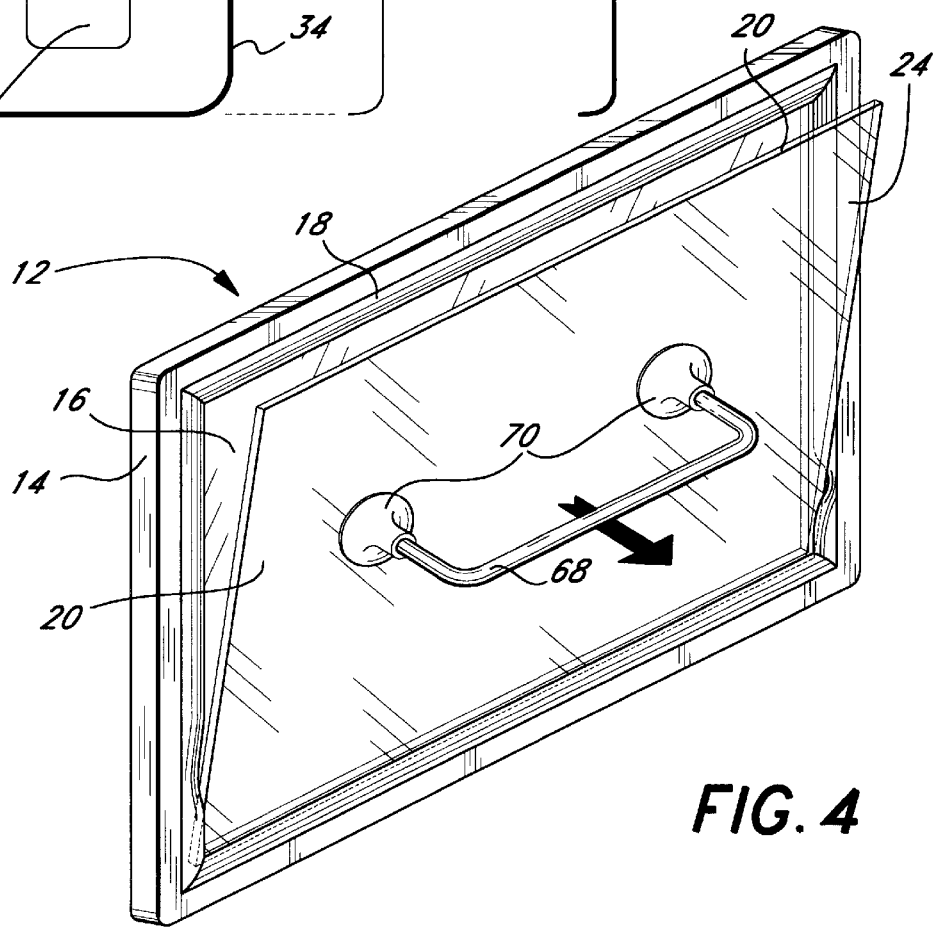

WINDOW GUARD AND REPLACEMENT SYSTEM FOR VEHICLE WINDOWS

BACKGROUND OF THE INVENTION

1. Field of the Invention

The invention relates to the filed of anti-graffiti devices for use in connection with windows, particularly for vehicles such as buses.

2. Description of the Prior Art

Municipal buses and other vehicles of public transport are the common targets of vandalism by graffiti. Not only does this vandalism detract from the appearance of the vehicle, but can in some cases interfere with the vision of the passengers and the driver depending on window location.

Therefore the conventional practice has been that when the windows become sufficiently occluded or vandalized by scratches, spray paint or other graffiti that the window is changed out. For example in a bus the glass pane is retained within a rubber mount and the rubber mount is then fitted into aluminum frame. A rubber locking strip is inserted into a groove to act as a wedge, which squeezes the rubber mount tightly onto the window pane to establish not only physical capture but a waterproof seal. Once the lock is removed, the receiving channel becomes flexible enough to open allowing the window to be removed, typically through a handled tool provided with suction cup attachments. A new glass pane is then inserted into the rubber mount and the locking strip reinserted. The removed glass pane can then be subjected to solvents, polishing and other procedures off site to remove the paint or other graffiti.

However, the removal of the window and later the graffiti from the window pane is extremely time consuming and expensive. Therefore, the prior art has devised window guards and which are typically thin sheets of plastic which are disposed on one side of the window pane and held to the window pane by means of an adhesive disposed around the perimeter. Typically such plastic window guards are applied to the inside surface of the window pane and are sized to fit within the exposed area of the pane, which area extends outside of the rubber mount. This allows then the plastic guard to be replaced rather than the entire window.

However, proper and smooth placement of the plastic guard onto the window pane and its sealing by a ring of self-sealing adhesive is also time consuming and often difficult to achieve. The difference in the thermal expansion between the plastic and the glass can and is typically of such a magnitude that wrinkles, bagging, a buckling of the plastic occurs during the typical day as the glass expands or contracts with the outside temperatures. The continual expansion and contraction of the glass with respect to the plastic eventually weakens the adhesive seal of the plastic guard to the glass and results in its detachment.

Therefore, what is needed is a design by which anti-graffiti plastic guards can be quickly applied to vehicular windows and removed therefrom without the disadvantages of the prior art guards.

BRIEF SUMMARY OF THE INVENTION

The invention is a mount for use with a protected window comprising a frame, a window pane and a guard sheet disposed on the window pane. The mount comprises a lower portion for seating within the frame. An upper portion provides for seating the window pane and window guard. The window guard is retained adjacent to the window pane by disposition of the window guard within a conforming seating space within the upper portion. As a result, the window guard may be quickly removed and reinserted and whereby protection is provided to the pane while accommodating different thermal coefficients of expansion between the window pane and window guard.

The lower portion of the mount includes anchors for assisting in the retention of the mount within the frame. The anchor is comprised of upwardly directed longitudinal ribs inclined to allow for ease of insertion of the mount into the frame while resisting withdrawal of the mount from the frame. The upper portion includes a locking channel and a locking strip to allow the seating space within the upper portion to selectively open or to remain closed according to whether the locking strip is disposed in the of locking channel.

The seating space in the an upper portion comprises a first region for providing a seating for the window pane and a second region for providing a seating for the window guard. The seating space is defined within the upper portion by two opposing arms. One of the arms has defined therein the second region. The second region comprises a beveled shoulder and the window guard is provided with a conforming beveled edge so that the window guard can be disposed within the mount only in a single preferred orientation with respect to the window pane. The one arm in which the second region is defined is resiliently inclined inward into the seating space to provide an inherent inward resiliency against the window guard and window pane when disposed in the seating space. The inward inclination of the one arm is approximately 10°.

The invention is also defined as a graffiti protected window for a vehicle comprising a window pane, a frame, a mount disposed in the frame in which the window pane is seated, and a window guard disposed in the mount and seated within the mount. The window guard is maintained in contact with the window pane only by virtue of common seating of the window guard and window pane and the mount. As a result, the graffiti protected window may be quickly refurbished by replacement of the window guard and whereby retention of the window guard against the window pane is maintained notwithstanding differences of thermal coefficients of expansion between the window pane and window guard.

The mount provides seating of the window pane and window guard along the entire periphery of the window pane and window guard. The mount is also provided with a locking channel and a locking strip removably disposed in the locking channel to selectively maintain capture of the window pane and window guard within the mount when seated therein. The mount defines a seating space in which the seating of the window pane and window guard are provided. The seating space is comprised of a first region for seating the window pane and a second space for seating the window guard. The seating space is defined between two parallel arms of the mount. A first region is defined between the two arms to a first depth within the seating space and a second region is defined between the two arms to a corresponding second depth within the seating space. The second depth of the second region for the guard window is less than the first depth of the first region for seating the window pane. The first and second regions are contiguous spaces without separation from each other. The second region is provided with a bottom seating surface which is inclined and the window guard has a beveled edge for conformably fitting with the inclined bottom surface of the second region so that orientation of the window guard with respect to the window pane has a single preferred orientation. The arm adjacent to the second region is biased inwardly towards the opposing one of the two arms. The biased arm is inclined approximately 10° with respect to the vertical toward the opposing arm.

Finally, the invention is still further defined as an improvement in the method for providing quick change of a graffiti protected window including a glass pane in a frame comprising the steps of disposing a separate window guard, having a periphery, onto the glass pane by disposing the periphery of the window guard into a resilient mount disposed in the frame, which mount also provides seating for the glass pane into the frame.

The invention and its various embodiments may now be better visualized by turning to the following Figures wherein like elements are referenced by like numerals.

BRIEF DESCRIPTION OF THE DRAWINGS

FIG. 3 is a cross-sectional view of the rubber mount as shown in FIG. 2.

FIG. 4 is a perspective view diagrammatically depicting a means for removing and inserting a plastic window guard onto a window provided with a rubber window mount designed according the invention.

DETAILED DESCRIPTION OF THE PREFERRED EMBODIMENTS

A graffiti protected glass window for a vehicle can be quickly refurbished by changing a thin plastic guard window overlying the glass pane. The plastic guard window is retained within a resilient elastomeric mount which also retains the glass pane within the rigid window frame. A window guard seating space is defined along one side in a upper portion of the seating space defined in the mount for accommodating the glass pane. The side of the mount into which the window guard seating space is defined is molded so as to be slightly inwardly inclined to assist in weather sealing the window guard. The mount is selectively locked and unlocked by the use of a conventional locking channel and locking strip. When unlocked, the window guard is easily removed and reinserted using conventional hand tools. When locked, the window guard is securely maintained against the window pane, but is able to accommodate differentials in thermal expansion between the window glass and the window guard since their common attachment occurs only by virtue of their common seating within the mount.

Figure 1:
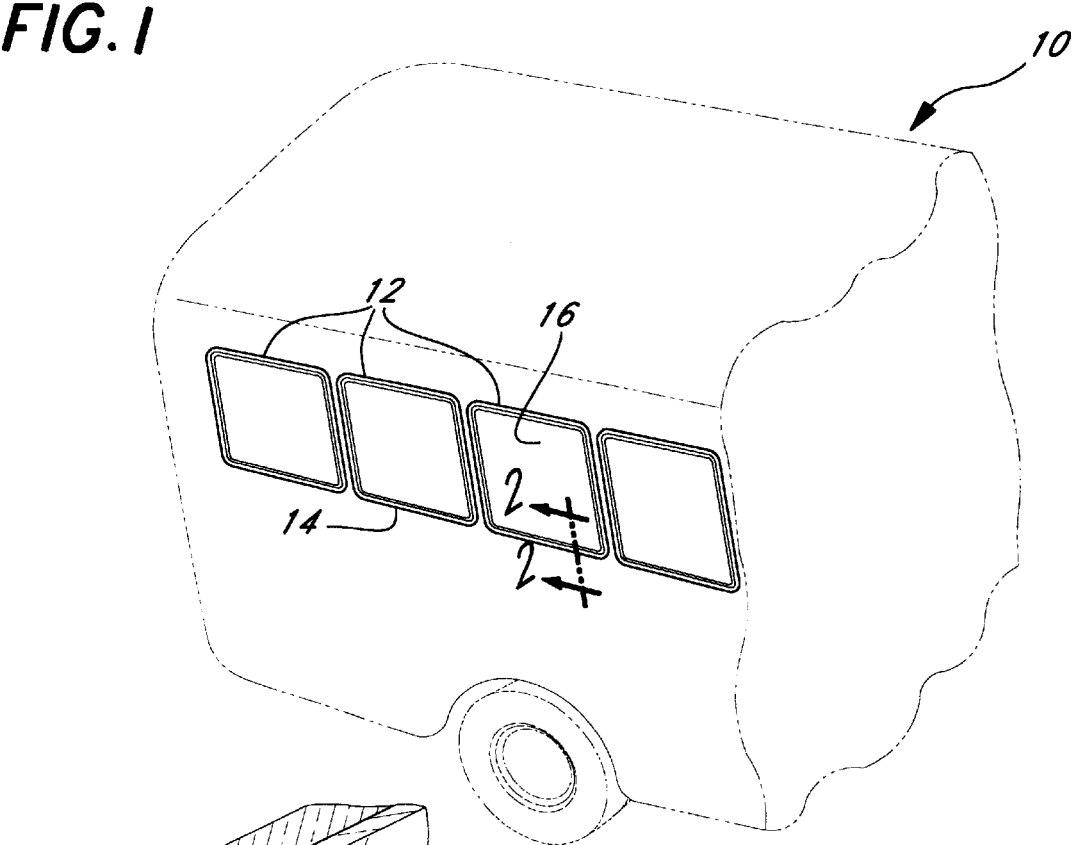
FIG. 1 is a side elevational view of a bus showing the side passenger windows having window mounts and plastic protective window guards according to the invention.

FIG. 1 shows a vehicle, generally denoted by reference number 10, which is depicted in the illustrated embodiment as a municipal passenger bus. Vehicle 10 may of course be any vehicle, structure or object having windows or surfaces which may be subject to graffiti for which plastic guards have been provided. It is certainly within the scope of the invention that it may also be used on boats, airplanes, trains, subway cars, monorails and other similar types of vehicles as well as fixed structures.

Vehicle 10 is provided with a plurality of side passenger windows 12. Each passenger window 12 is comprised of a frame 14 which is typically a metal or aluminum frame in which a glass pane 16 is disposed. Although any surface of window pane 16 may be subject to vandalism, typically the interior surfaces of window pane 16 are most accessible by the passengers and subjected to graffiti. Therefore in the illustrated embodiment protection for the inside surface 22 of window pane 16 are described although the same protection could be provided to the opposing exterior surface of window pane 16 or simultaneously to both the interior and exterior surfaces with appropriate modifications to the illustrated embodiment as described below.

Figure 2:
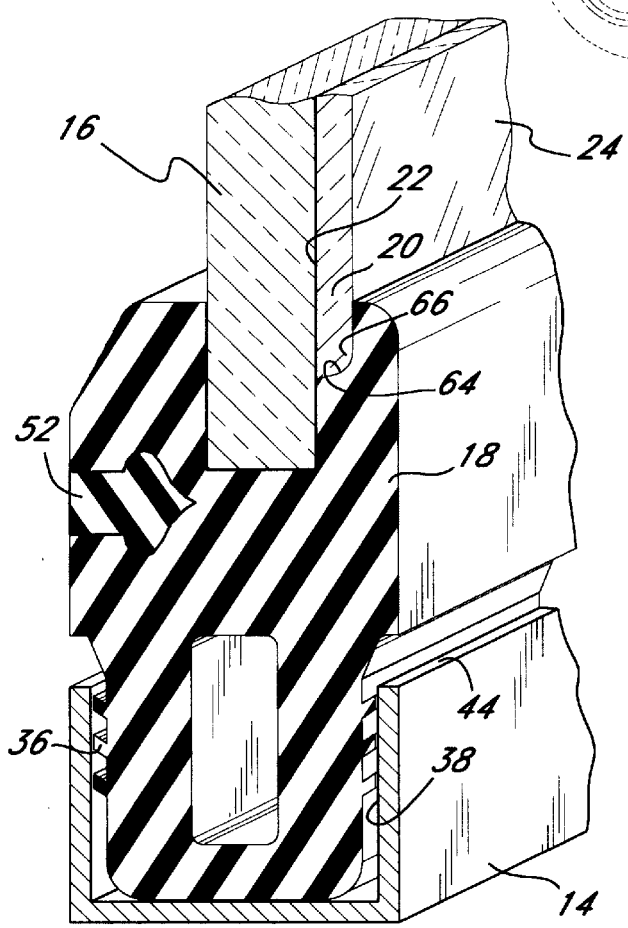
FIG. 2 is a cross-sectional perspective view of the assembled window pane, window guard and rubber mount disposed in the aluminum frame of the window.

FIG. 2 is a cutaway perspective view of one of windows 12 shown in FIG. 1 as taken through section lines 2—2 of FIG. 1. Glass window pane 16 as shown in FIG. 2 is set within a rubber of elastomeric mount 18 which in turn is set within frame 14. Mount 18 may be fabricated as a rubber or plastic structure in an extruded form as described below in connection with FIG. 3. A plastic window guard 20 is disposed of inside surface 22 of glass pane 16 and is similarly disposed into a shoulder space 26 in mount 18 as best depicted in FIG. 3. FIG. 3 is a cross-sectional side view of mount 18 shown in isolation of pane 16 and guard 20. Guard 20 may be any type of sheet plastic or sheeting material now known or later devised which is capable of providing vandal protection, scratch or abrasion protection, or anti-graffiti protection to inside surface 22 of pane 16. Guard 20 may serve other physical or optical functions in addition to graffiti protection. For example window guard 20 may include one or more coatings, diagrammatically depicted by layer 24 in FIG. 2 to provide scratch or abrasion resistance, polarization, paint resistance or shading as may be desired.

In any case, it is preferred that layer 24 have such optical properties to generally permit clear adequate vision through window 12 when applied to pane 16. Window guard 20 is placed on pane 16 without the benefit of any adhesives or other materials for securing window guard 20 to pane 16. Guard 24 is maintained in contact with pane 16 simply by capture within mount 18 along its entire or substantially entire periphery of mount 18 adjacent to pane 16.

Turn now and consider the details of the shape of mount 18 as contemplated in the illustrated embodiment as depicted in the side cross-sectional view of FIG. 3. Mount 18 is comprised of a lower portion 28 which fits into frame 14 and an upper proportion 30 which captures or provides a fitting for pane 16 and guard 20. Lower portion 28 may assume any design, shape, form or configuration now known or later devised for capture and support of mount 18 within frame 14. The details of the design shown in the illustrated embodiment are largely immaterial to the invention and many other designs are known and may be equivalently substituted. In the illustrated embodiment, lower portion 28 has a generally rectangular prismatic shape in which an interior prismatic, rectangular cavity 32 has been defined. Exterior surface 34 of lower portion 28 includes a plurality of longitudinal ribs 36 which are inclined upwardly by a few degrees to form barbs, which allow the downward insertion of lower portion 28 into a closely fitting frame 14, while tending to prevent withdrawal mount 18 from frame 14. In other words, as mount 18 is drawn upwardly, ribs 36 tend to grab onto the interior surface 38 of frame 14 and rotate from their upwardly inclined position toward a perpendicular position thereby compressing wall 40 of lower portion 28. The degree of compression allowed and hence the stiffness of lower portion 28 is determined in part by the inherent resiliency or stiffness of the material from which it is made, as well as the size of cavity 32. Lower portion 28 terminates in an upper section by means of an inclined outwardly directed wall 42 which seats against upper edge 44 of frame 14 to provide a watertight seal to prevent the penetration and entrapment of water within frame 14 and the interstices between lower portion 28 and frame 14.

Upper portion 30 of mount 18 includes a locking channel generally denoted by reference number 46. Locking channel 46 is a prismatic channel running along the length of the mount 18. Channel 46 is formed as a spade shaped cross-section comprised of two lobes 48 and an apex 50. A conforming locking strip 52 having a positive shape corresponding to the negative shape of channel 46 is force fitted into locking channel 46. With locking strip 52 removed, right hand shoulder 54 tends to be pliable and easily rotated inwardly and outwardly as shown by arrow 56 to loosen or unlock seating space 58 defined within the upper portion 30 of mount 18 in which pane 16 and window guard 20 are seated. With locking strip 52 inserted within locking channel 46, arm 54 is wedged into place to lock pane 16 and guard 20 within seating space 58.

Opposing arm 54 is an arm 60 which is molded so as to have a slight inward inclination of about 10° from the vertical as shown in solid outline in FIG. 3. When guard 24 and pane 16 are inserted into space 58, arm 60 will be forced outwardly to assume a generally upright position as shown in dotted outline in FIG. 3.

The base 62 of seating space 58 has a width approximately equal to the width of glass pane 16 which snugly seats therein. Spaced upwardly from base 62 is shoulder space 26 into which window guard 24 seats. The bottom of space 26 is defined by an inclined shoulder 64. Shoulder 64 has an inclination of approximately 45° to match a similarly 45° beveled surface 66 defined on the periphery of window guard 24. Window guard 24 is dimensioned to flushly or fully seat within space 26 so that beveled surface 66 abuts shoulder 64. If by any chance window guard 20 is reversed so that coating 24 is positioned against pane 16 as opposed to being positioned away from it, the lack of a flush fit between beveled surface 66 and shoulder 64 would become immediately apparent, since it will be impossible to cleanly or easily fit window guard 20 into space 26.

The structure of mount 18, the window guard 24 and pane 16 now having been described in detail, the method by which the window guard is changed out after being vandalized by graffiti is diagrammatically depicted and described in connection with FIG. 4. FIG. 4 is a perspective view showing a window 12 mounted within a frame 14. After window guard 20 has been vandalized and needs to be removed, window guard 20 can be peeled from, and installed into, arm 60 without removing locking strip 52. A removal tool, comprised of a handle 68 fitted with a pair of end suction cups 70, is attached to the exposed surface of window guard 20 and the window guard simply peeled or forcibly removed from pane 16. Since only arm 60 is retaining window guard 20 onto pane 16, guard 20 can be easily peeled from or slipped out of mount 18. Window pane 16 remains in place within mount 18 and mount 18 remains firmly embedded within frame 14. The removal of window guard 20 typically takes less than 45 seconds even by a minimally trained worker.

Once the vandalized window guard 20 has been removed, a new replacement window guard 20 can be inserted. This is accomplished by inserting the edge of the replacement window guard into space 26 with a conventional strip insertion tool which opens up arm 60 slightly while pressing window guard 20 against pane 16. The tool is run around the periphery of mount 18 thereby slipping the edge of the new window guard 20 into space 26. The operation typically takes less than 120 seconds. After the new window guard 20 has been slipped into place, window guard 20 can be peeled from, and installed into, arm 60 without removing locking strip 52.

The refurbishment of window 12 is thus completed without ever having to remove pane 16 or mount 18 and a new, inexpensive window guard 20 inserted. The entire operation of removal and insertion typically takes less than 3 minutes. The vandalized window guards may be refurbished or simply discarded since the cost of these sheets allows them to be disposable.

It should now become evident upon by consideration of the structure as shown in FIGS. 1–3 and in particular FIG. 2. That there is no direct attachment between window guard 20 and pane 16. The two are physically kept together by means of the peripheral seal provided by mount 18 and to a lesser extent by the vacuum sealing between guard 20 and window 16 by virtue of their proximate positioning and peripheral sealing. Notwithstanding the lack of a direct plastic-to-glass peripheral seal, guard 20 and pane 16 are nevertheless free to slip with respect to each other by an amount sufficient to accommodate thermal expansion and contraction. The resiliency of mount 18 is similarly sufficient to accommodate differential expansion and contraction of guard 20 in mount 18, while still maintaining a tight and watertight capture of guard 20 and pane 16.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A graffiti protected window for a vehicle comprising:

a frame;

a mount attached to said frame;

a window pane seated within a first seating space within said mount;

a window guard seated within a second seating space within said mount, said window guard maintained in tight contact with said window pane only by virtue of common seating of said window guard and window pane and resiliency of said mount providing a peripheral water tight seal along entire peripheries of said window pane and said window guard, wherein said mount is provided with a locking channel and a locking strip removably disposed in said locking channel to selectively maintain capture of said window pane and window guard within said mount when seated therein, whereby said graffiti protected window may be quickly refurbished by replacement of said window guard and whereby retention and sealing of said window guard against said window pane is maintained in spite of differences of thermal coefficients of expansion between said window pane and window guard.

2. The window of claim 1 wherein said seating spaces are defined between two parallel arms of said mount, said first seating space being defined between said two arms to a first depth and said second seating space being defined between said two arms to a corresponding second depth, said second depth of said second seating space for said guard window being less than said first depth for seating said window pane.

3. The window of claim 2 wherein said second seating space is provided with a bottom seating surface which is inclined and wherein said window guard has a beveled edge for comformably fitting with said inclined bottom surface of said second seating space so that orientation of said window guard with respect to said window pane has a single preferred orientation.

4. The window of claim 2 wherein said arm adjacent to said second seating space is biased inwardly towards said opposing one of said two arms.

5. The window of claim 4 wherein said biased arm is inclined approximately 10° with respect to the vertical toward said opposing arm.

* * * * *